Figure 1:
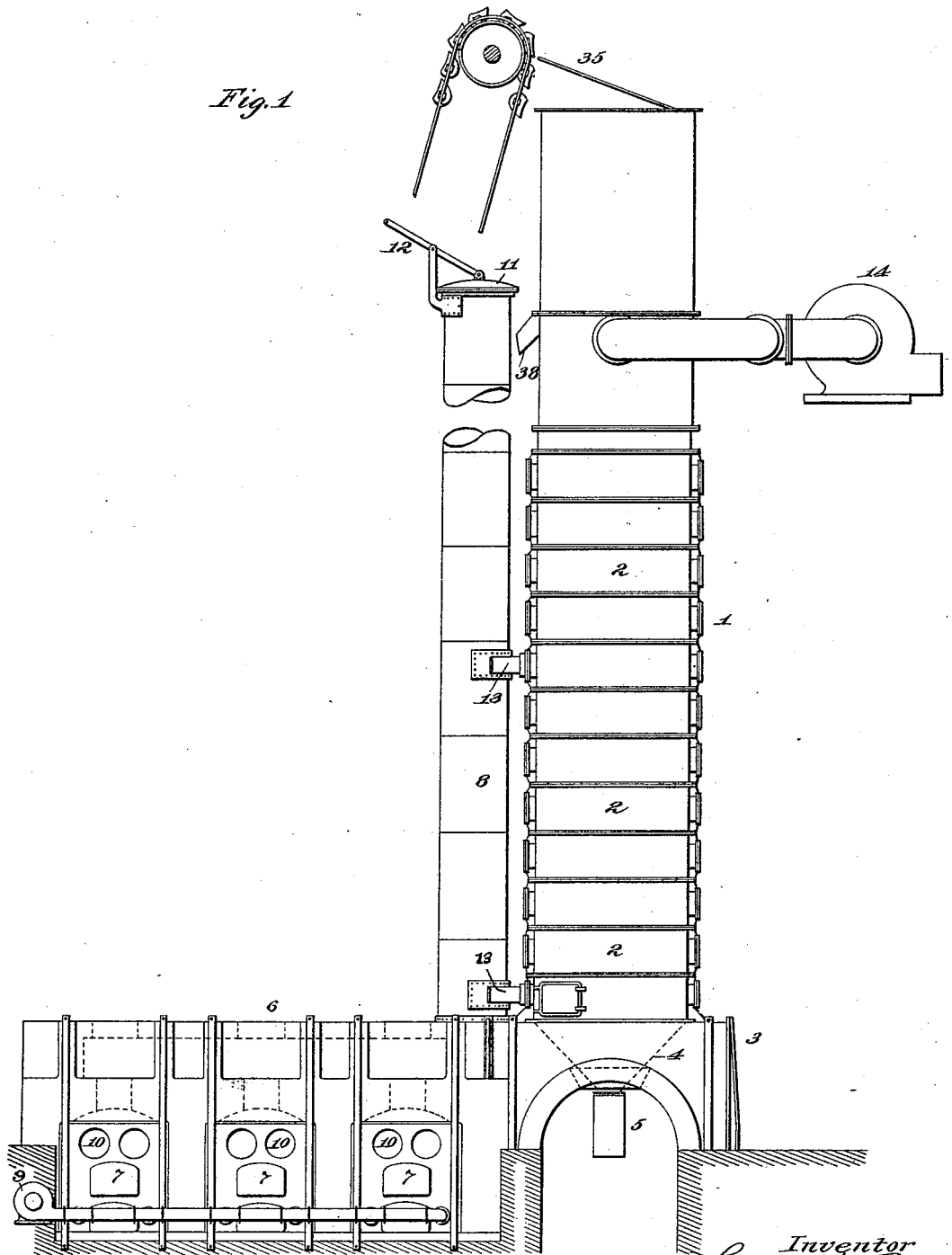

No. 648,933. Patented May 8, 1900.
T. A. EDISON.
DRIER.
(Application filed May 23, 1898.)

(No Model.) 3 Sheets—Sheet 1.

Witnesses:

Inventor
Thomas A Edison
By Rich N Dyer
Atty

No. 648,933. Patented May 8, 1900.
T. A. EDISON.
DRIER.
(Application filed May 23, 1898.)
(No Model.) 3 Sheets—Sheet 2.

Witnesses:

Inventor
Thomas A. Edison
By Rich'd N. Dyer
Att'y.

No. 648,933. Patented May 8, 1900.
T. A. EDISON.
DRIER.
(Application filed May 23, 1898.)
(No Model.) 3 Sheets—Sheet 3.
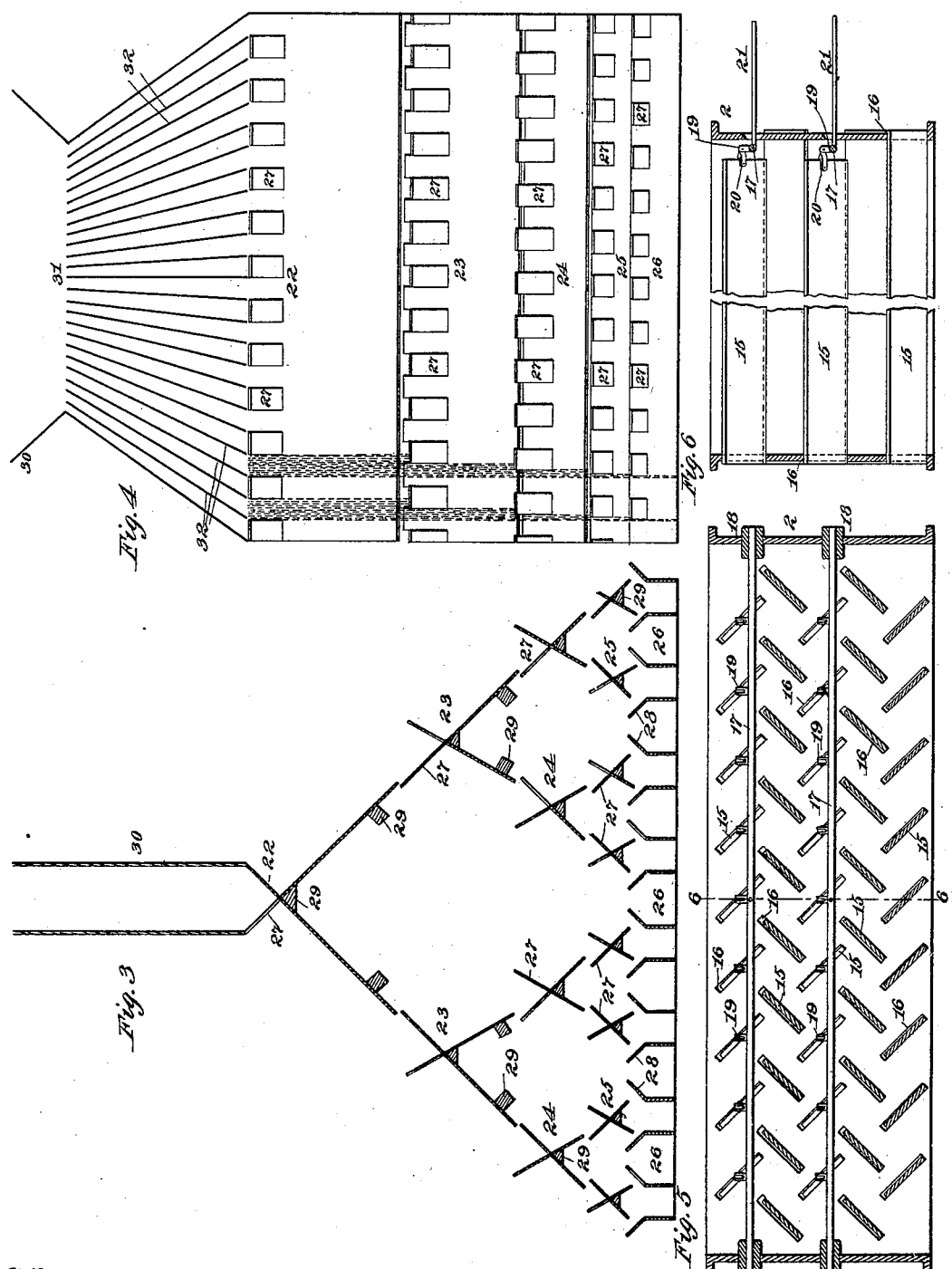
Witnesses:
Inventor
Thomas A. Edison
By Rich'd N. Dyer
Atty.

UNITED STATES PATENT OFFICE.

THOMAS A. EDISON, OF LLEWELLYN PARK, NEW JERSEY.

DRIER.

SPECIFICATION forming part of Letters Patent No. 648,933, dated May 8, 1900.

Application filed May 23, 1898. Serial No. 681,477. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Driers, (Case No. 992,) (for which British Patent No. 8,533 of 1898 was granted to Benjamin Joseph Bernard Mills as a communication from myself,) of which the following is a specification.

My invention relates to various new and useful improvements in driers adapted for use in drying pulverized material, such as iron ore.

The object of the invention is to provide a drier capable of effectively drying material in large quantities and in an economical manner.

In carrying out my invention I employ a vertical drying-chamber made preferably of metallic sections bolted together, each section being provided with a series of baffle or deflecting plates arranged at a proper angle to allow for the passage of the material over the same, suitable provision being made for an even distribution of the material into the drying-chamber at its upper end and a furnace being employed for supplying hot air to the drying-chamber. In the drying of material not affected by direct fire heat, such as iron ore, it is preferable for economical reasons to also direct the products of combustion of the furnace through the drying apparatus. The passage of the products of combustion and heated air through the drying apparatus will keep the baffle or deflecting plates in a heated state, so that the material in passing over the same will be freed of its moisture. The material will be evenly fed into the drier at its upper end and will pass in the form of thin even streams through the drier, each stream being deflected in a zigzag course by reason of the deflecting-plates and in its descent being met by the ascending currents of hot air and products of combustion, which will carry off the moisture from the material, so that the material will be removed from the bottom of the drier in a thoroughly-dried condition. Preferably a suction-fan will be employed, connected to the drying-chamber at its upper end and by means of which a powerful circulation of the products of combustion and hot air will be maintained through the drying-chamber. By preference also the hot air and products of combustion will be directed into the drying-chamber at several points, so that a part of the heating agents passes only a portion of the way through the drying-chamber. In this way I prevent the possibility of drafts being choked by excessive quantities of the material being admitted to the drying-chamber.

My invention contemplates not only the improvements in the drying apparatus proper, but also relates to details in the construction of the feeding device, by which the material will be distributed in fine thin even streams at the top of the drier, and also to means by which material will be prevented from lodging permanently on the plates, and finally to an improved screening apparatus coöperating with the drier, by which material too large to be effectively dried will be rejected. This large material, in the case of iron ore, will be directed to a suitable grinding apparatus, by which it may be reduced in size.

In order that my invention may be better understood, attention is directed to the accompanying drawings, forming part of this specification, in which—

Figure 2:
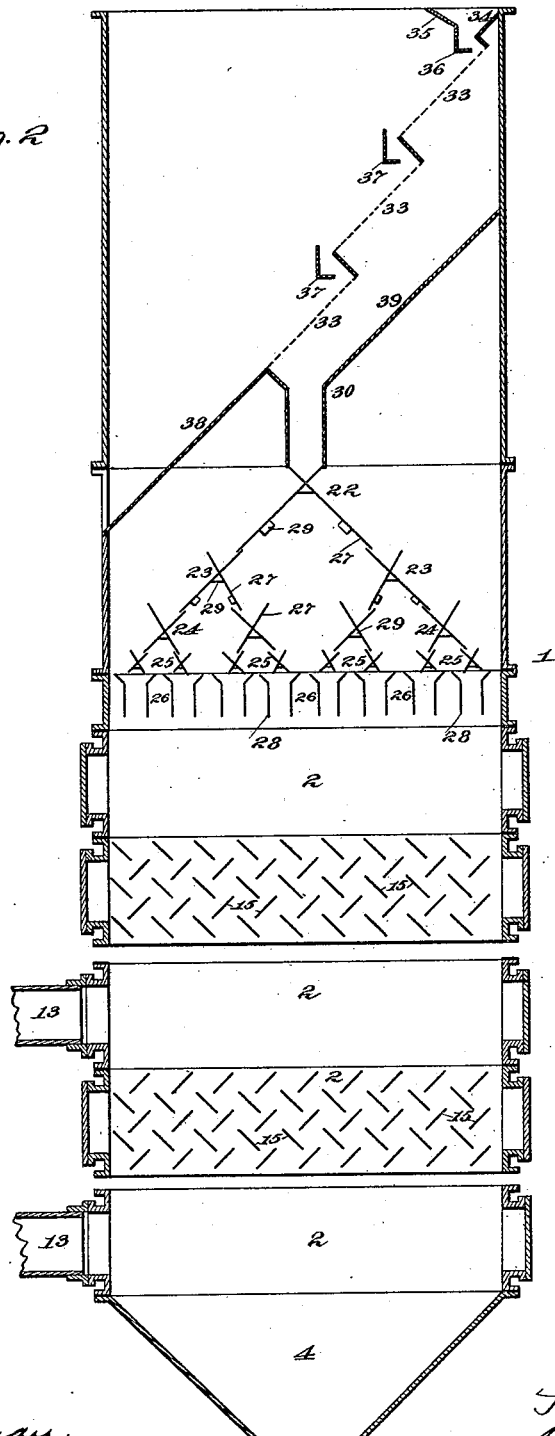

Figure 1 is a side elevation of the improved drier; Fig. 2, an enlarged vertical sectional view of the same; Fig. 3, an enlarged sectional view of the distributing apparatus; Fig. 4, an elevation of the same; Fig. 5, an enlarged view of one section of the drier, illustrating mechanism for shaking two of the sets of deflecting-plates thereof; and Fig. 6, a section on the line 6 6 of Fig. 5.

In all of the above views corresponding parts are represented by the same numerals of reference.

1 represents the drying-chamber, which is composed of sections 2, arranged vertically one above the other. Each section is flanged at its top and bottom, and the flanges of adjacent sections are bolted together. Preferably a packing of asbestos is placed between these flanges. The drying-chamber 1 is carried on a suitable foundation 3, so as to be firmly supported. The bottom of the drying-chamber is formed into a hopper 4, with which may coöperate a conveyer or elevator 5 to carry off the dried material. A furnace 6, of any suitable construction, is placed adjacent to the drying-chamber. This furnace in the embodiment of the invention illustrated comprises three fire-boxes 7, all connected to a single stack 8. A fan 9 may be employed for supplying the fire-boxes 7 with the proper draft. Openings 10 are formed in the front walls of the furnace above each fire-box, through which air will be drawn by the draft and heated before passing to the stack 8. The stack 8 is provided with a cover 11, which is normally closed, but which may be opened by a connection with a lever 12. Branch flues 13 13 connect the stack 8 with the interior of the drying-chamber. One of these flues is shown as connecting with the drying-chamber at its lower end, and the other flue is shown as connecting with the drying-chamber at about its center. It will be understood, however, that only one of such flues may be used and that when a series of such flues are employed they may be disposed in any suitable way. A suction-fan 14 connects with the drying-chamber at or near its upper end and by which a powerful upward draft will be maintained through said drying-chamber. The sections 2 2 of the drying-chamber, with the exception of those to which the branch flues 13 connect and the sections which inclose the distributing device, together with the section immediately below the distributing device, are all provided with baffle-plates 15 therein, arranged in horizontal rows, the plates being inclined and the upper edges of the plates of one row extending above the plane of the lower edges of the plates in the row immediately above, a sufficient space being provided between the bottom edges of the plates of each row and the plates immediately below the same as to allow for the passage of the material. The deflecting-plates 15 are preferably carried in slots 16, Figs. 5 and 6, formed in the front and back walls of the sections 2, so that the said plates may be removed, if desired. By using these deflecting-plates it will be noted that the material will be deflected in a zigzag course through the drying-chamber and not only will the material be given a very much greater extent of travel, but it will move very slowly through the apparatus, so that it may be dried to the greatest advantage.

I find in practice that with very damp material, such as iron ore, there is danger of the material lodging upon the upper plates and clogging the apparatus, but that as soon as the material passes the upper plates it will have been superficially dried and will not lodge upon any of the succeeding plates. In order to prevent the material from lodging upon the upper plates of the drier, I arrange one or more of the sets of deflecting-plates of the uppermost section 2, containing such plates, in such a way that the said plates may be given a shaking motion when desired.

In Figs. 5 and 6, 17 17 are two rock-shafts mounted in bearings 18 on the desired section of the drier, each rock-shaft being provided in line with each of the deflecting-plates 15 with a bifurcated lug or ears 19. Each of the deflecting-plates 15 is provided with a lug 20, Fig. 6, which is pinned between the ears 19 of one of the rock-shafts 17. A suitable handle 21 may be inserted within an opening in either of the rock-shafts, and by operating said handle to rock the said shafts the plates will be given a shaking motion to dislodge any material therefrom.

I illustrate the first and third rows of deflecting-plates as being provided with means for shaking them; but it will be obvious that only one of said rows of plates may be shaken.

In order that the material may be dried to the best advantage, it is desirable that it should be distributed evenly through the apparatus, so that all of the deflecting-plates 15 will receive substantially-equal amounts of material. This is of importance not only because in this way the material will pass through the drier in the form of thin streams, but also because the draft through the apparatus will be uniform, and the interior of the drying-chamber will therefore be maintained at a practically-constant temperature throughout. The preferred form of distributing device is shown in the drawings. This distributer comprises several sets of alternately-disposed inclined deflecting-surfaces, the deflecting-surfaces of the first or uppermost set dividing the material and allowing one half to move to the right and the other half to the left. The two deflecting-surfaces immediately beneath the first surface each divide the material received by them—namely, one-half of the bulk—and direct one portion to one side and the other portion to the other side. In this way the material will be gradually subdivided by the alternately-arranged deflecting-surfaces, and in the instance illustrated this subdivision will result in obtaining from a single mass of material thirty-two even thin streams of substantially-equal capacity. The deflecting-surfaces referred to comprise an uppermost section 22, two sections 23 beneath the same, four sections 24 beneath the sections 23, eight sections 25 beneath the sections 24, and sixteen sections 26 beneath the sections 25. The sections 22, 23, 24, and 25 are each formed of inclined deflecting-plates 27 27, alternately arranged in the form of an approximate X. The sections 26 consist, preferably, of single deflecting-plates 28 with spaces between them through which a part of the material will be deflected. The several sections of the distributer are supported by suitable braces 29 in the top of the drying-chamber 1. In order that the material may be distributed lengthwise of the top section 22, I provide a hopper 30, having a contracted portion 31, through which the material passes and by which the material will be reduced to a relatively-small area. Below the contracted portion 31 the hopper flares outwardly until at its lower end it reaches a width substantially equal to that of the section 22. The bottom portion of the hopper 30 is provided with radial partitions 32, extending at their upper ends adjacent to the contracted portion 31 and by reason of which the material in passing through said contracted portion will be caused to spread out equally, so that it will be deposited upon the section 22 of the distributer substantially throughout the entire width thereof.

In the drying of iron ore I find that the best results are obtained when the particles are relatively small in size, but that larger particles will not be effectively dried. When, therefore, the improved drying apparatus is employed for the drying of iron ore, it is desirable to employ suitably-arranged screens mounted above the same and by which the larger particles of the material will be rejected and only those particles which can be effectively dried will be allowed to reach the drier. The said screening apparatus may comprise one or more screen-surfaces 33, (three of said surfaces being shown,) arranged one above the other in an inclined position. Above the uppermost of these screens is a plate 34, against which the material will be directed from a suitable feed chute or apron 35. Beneath the plate 34 is mounted a ledge or shelf 36, which may be conveniently formed of an angle-iron, and similar ledges 37 are mounted beneath the top and intermediate screens for receiving the discharge therefrom. The purpose of these ledges or shelves is to allow the material to accumulate thereon in a pile, from which material will be forced in a fine stream. This serves to effectively check the velocity of the material passing over the screens, so that a very perfect screening operation will take place. The tailings from the lowermost screen may pass by a chute 38 to any suitable place; but in the case of iron ore the said chute leads to suitably-arranged crushing-rolls, by which the material will be reground. The screenings will be caught by a chute 39 and directed into the hopper 30.

The operation of the improved device will be as follows: The fires being started in the furnace 6 and the forced draft applied, the products of combustion will pass through the stack 8 and out at its upper end, the cover 11 being elevated for this purpose. When the stack is hot and the draft is well started, the suction-fan 14 will be set in motion and the cover 11 closed, so that the draft will be directed through the branch flues 13 into the drying-chamber. Air will also be drawn by suction through the openings 10 and will be heated in passing over the fire-boxes. The passage of the hot air and products of combustion through the drying-chamber will heat the deflecting-plates 15 therein and keep the surfaces hot. Material is now fed onto the trough or chute 35 and impinges against the plate 34, from which it rebounds onto the ledge or shelf 36 and accumulates thereon in a pile. As fresh material is added to this pile it falls from a state of absolute rest onto the uppermost screen, and so on through the screening apparatus, being checked before passing over each screen. The tailings pass onto the chute 38 and are treated in any suitable way. The screenings dropping on the trough 39 enter the hopper 30 and in passing through the contracted portion 31 thereof will be reduced to a relatively-small area. After passing said contracted portion the material will be spread out by the partitions 32 and be deflected onto the section 22 of the distributer, by means of which the material will be divided into two parts—one half moving to the right and the other to the left. The half of the original bulk of the material thus separated by the section 22 will pass to the sections 23, where a further subdivision takes place, and so on through the apparatus until by the sections 26 of the distributer the material will be divided into thirty-two thin even streams, all of substantially the same volume. These thin even streams of material reaching the deflecting-plates 15 will be caused to travel in zigzag paths downward through the apparatus, and in this movement the material will not only be subjected to the heat of the plates themselves, but will also encounter the ascending currents of hot air and the products of combustion, so that all moisture will be removed from the same and the material will pass out of the hopper 4 onto the conveyer 5 in a thoroughly-dried condition. In the event of material tending to lodge on the uppermost plates, which may be observed by an attendant stationed at that point, the said plates may be shaken by the rock-shafts 17, so as to agitate them and cause the material to drop off, or, if desired, the said plates may be agitated continuously.

Having now described my invention, what I claim as new, and desire to secure by Letters Patent, is as follows:

1. In a drier, the combination with a drying-chamber, of an exhaust from the top thereof, a distributing device at the top of said chamber for feeding the material in a number of thin, wide streams thereto, baffle-plates over which the streams of material pass by gravity in a zigzag course, and a furnace connected with the bottom and the center of the drying-chamber through spaces unprovided with baffle-plates, substantially as set forth.

2. In a drier, the combination with a drying-chamber, of a furnace connected to said chamber, a series of baffle-plates within said chamber to which the material to be dried is fed in a number of wide and thin streams, and means for agitating a part of said baffle-plates, substantially as set forth.

3. In a drier, the combination with a drying-chamber, of a furnace connected to said chamber, a series of baffle-plates within said chamber to which the material to be dried is fed in a number of wide and thin streams, and means for shaking longitudinally a part of said baffle-plates, substantially as set forth.

4. In a drier, the combination with a drying-chamber, of a furnace connected to said chamber, a series of baffle-plates within said chamber to which the material to be dried is fed in a number of wide and thin streams, a series of rock-shafts, and connections between said rock-shafts and a part of said baffle-plates, whereby the latter may be shaken longitudinally, substantially as set forth.

5. In a drier, the combination with a chamber provided with a series of baffle-plates and a furnace connected to said chamber, of a distributer above said chamber for supplying a number of wide and thin streams of material to the baffle-plates and comprising a series of deflecting-plates arranged in horizontal rows and of progressively-increasing numbers, whereby a successive subdivision of the material will be effected, substantially as set forth.

6. In a drier, the combination with a chamber provided with a series of baffle-plates and a furnace connected to said chamber, of a distributer above said chamber for supplying a number of wide and thin streams of material to the baffle-plates and comprising a series of deflecting-plates arranged in horizontal rows and of progressively-increasing numbers, whereby a successive subdivision of the material will be effected, and a contracted hopper above said distributer, substantially as set forth.

7. In a drier, the combination with a chamber made of sections supported one above the other, of a distributer above said chamber and a number of baffle-plates carried by the sections of the chamber, substantially as set forth.

8. In a drier, the combination with a chamber made of sections supported one above the other, of a distributer above said chamber, a number of baffle-plates carried by a part of the sections of the chamber, and a furnace connected to the bottom of said chamber and to an intermediate section which is unprovided with baffle-plates, substantially as set forth.

9. In a drier, the combination with a drying-chamber, of a furnace connected to the bottom of said chamber and to an intermediate point thereof, baffle-plates located in the chamber above each furnace connection, a stack for said furnace, and means for regulating the draft through said stack, substantially as set forth.

This specification signed and witnessed this 11th day of April, 1898.

THOMAS A. EDISON.

Witnesses:
J. F. RANDOLPH,
F. C. DEVONALD.